US006798996B2

United States Patent
Sawada et al.

(10) Patent No.: US 6,798,996 B2
(45) Date of Patent: Sep. 28, 2004

(54) IMAGE FORMING APPARATUS

(75) Inventors: Masaichi Sawada, Tokyo (JP); Noboru Sawayama, Tokyo (JP); Shin Hasegawa, Chiba (JP); Shinji Kato, Kanagawa (JP); Naoto Watanabe, Kanagawa (JP); Kayoko Ikegami, Saitama (JP); Ryohichi Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/374,076

(22) Filed: Feb. 27, 2003

(65) Prior Publication Data
US 2003/0180057 A1 Sep. 25, 2003

(30) Foreign Application Priority Data

Mar. 19, 2002 (JP) ........................ 2002-075502

(51) Int. Cl.[7] .................. G03G 15/00; G06F 17/60
(52) U.S. Cl. .................. 399/8; 358/1.16; 399/9; 399/18
(58) Field of Search ............... 399/8, 9, 11, 18, 399/81, 82, 76, 77; 358/1.16

(56) References Cited

U.S. PATENT DOCUMENTS

| 5,359,391 | A | * | 10/1994 | Kuroyanagi et al. ........... 399/8 |
| 5,715,496 | A | | 2/1998 | Sawada et al. |
| 5,790,916 | A | | 8/1998 | Sawada |
| 5,835,816 | A | | 11/1998 | Sawada et al. |
| 5,850,582 | A | * | 12/1998 | Inoo et al. .................. 399/8 |
| 5,913,090 | A | | 6/1999 | Sawada et al. |
| 6,141,507 | A | | 10/2000 | Sawada |
| 2002/0091971 | A1 | | 7/2002 | Sawada et al. |
| 2002/0141763 | A1 | | 10/2002 | Sawada |

FOREIGN PATENT DOCUMENTS

JP  10-198235  *  7/1998

* cited by examiner

*Primary Examiner*—Sophia S. Chen
(74) *Attorney, Agent, or Firm*—Morrison & Foerster LLP

(57) ABSTRACT

An image forming apparatus includes an operation management part managing the operation of the image forming apparatus. A first operation information storing part accumulates in chronological order operation information relating to the operation managed by the operation management part. An external output part refers to cumulative results accumulated in the first operation information storing part and outputs, to the outside, the operation information according to the cumulative results.

5 Claims, 4 Drawing Sheets

FIG.4

| OPERATION INFORMATION CUMULATIVE RESULT | | |
|---|---|---|
| DATE TIME | OPERATION INFORMATION | RESULT |
| XX/XX 99:99:99 | ○○○ | NORMAL |
| .... | .... | .... |

BACK  FORWARD

IMAGE FORMING APPARATUS

BACKGROUND OF THE INVENTION

1. Field of the Invention

The present invention generally relates to image forming apparatuses for supporting maintenance when a malfunction occurs in the image forming apparatuses.

2. Description of the Related Art

Conventionally, maintenance by a maintenance man, such as replacement of consumables, has been regularly performed on image forming apparatuses such as a copying machine, facsimile machine, and printing machine so that good operating states are maintained.

However, sometimes, a malfunction of an image forming apparatus suddenly occurs depending on the environment and conditions where the image forming apparatus is used. In such a case, generally, the maintenance man asks a customer in detail about the operations performed on the image forming apparatus before the occurrence of the malfunction, and performs a reproduction test for duplicating the malfunction that has suddenly occurred. Then, the maintenance man investigates the causes of the malfunction through the reproduction test, and performs a repairing process corresponding to the causes of the malfunction.

On the other hand, under a condition where the repairing process is performed, in rare cases, the reproduction test cannot be performed though the maintenance man asks in detail about the operations performed on the image forming apparatus. In such a case, the maintenance man cannot investigate the root causes of the malfunction. Thus, the maintenance man guesses the causes of the malfunction and tentatively performs the repairing process corresponding to conceivable causes. Consequently, there is a disadvantage in that the same malfunction occurs again after a while.

SUMMARY OF THE INVENTION

Accordingly, it is a general object of the present invention to provide an improved and useful image forming apparatus in which the above-mentioned problems are eliminated.

It is another and more specific object of the present invention to provide an image forming apparatus that allows a maintenance man to easily investigate the causes of a malfunction having low repeatability so that the maintenance man can perform the correct repairing process on the image forming apparatus when performing maintenance thereon in response to the occurrence of the malfunction.

In order to achieve the above-mentioned objects, according to one aspect of the present invention, there is provided an image forming apparatus, including: an operation management part managing the operation of the image forming apparatus; a first operation information storing part accumulating in chronological order operation information relating to the operation managed by the operation management part; and an external output part referring to cumulative results accumulated in the first operation information storing part and outputting to outside the operation information according to the cumulative results.

Also, the image forming apparatus according to the present invention may further include: a second operation information storing part accumulating a part of the operation information accumulated in the first operation information storing part in chronological order; and a condition storing part storing a condition for storing, in the second operation information storing part, the part of the operation information accumulated in the first operation information storing part in chronological order, when a malfunction occurs in the operation of the image forming apparatus, wherein, based on the condition, the operation management part stores the part of the operation information accumulated in the first operation information storing part in chronological order in the second operation information storing part in a case where the malfunction occurs in the operation of the image forming apparatus when managing the operation of the image forming apparatus, and the external output part refers to storage result stored in the second operation information storing part and outputs to outside the operation information according to the storage result.

In addition, the image forming apparatus may further include: an operation management program storing part storing an operation management program for managing the operation of the image forming apparatus, wherein the operation management part executes the operation management program when managing the operation of the image forming apparatus, and stores description of the operation management program in chronological order in the second operation information storing part according to the execution of the operation management program.

Further, the image forming apparatus may further include: an operation part operating information; and a printing part, wherein the operation management part manages at least one of operation of the operation part and operation of the printing part, when managing the operation of the image forming apparatus, and the first information storing part accumulates at least one of setting data received via the operation part and output values of various sensors of the printing part in operation.

Additionally, the image forming apparatus may further include: a management target storing part storing a management target to be managed by the operation management part; and an operation part receiving a change request of the management target, wherein the operation management part updates the management target based on the change request received by the operation part, and when managing the operation of the image forming apparatus, the operation management part refers to the management target stored in the management target storing part and manages only the updated management target.

According to the present invention, it is possible to provide an improved image forming apparatus in that the image forming apparatus allows a maintenance man to easily investigate the causes of a malfunction having low repeatability so that the maintenance man can perform the correct repairing process on the image forming apparatus when performing maintenance thereon in response to the occurrence of the malfunction.

Other objects, features and advantages of the present invention will become more apparent from the following detailed description when read in conjunction with the following drawings.

BRIEF DESCRIPTION OF THE DRAWINGS

FIG. 4 is a schematic diagram showing a display screen displaying operation information.

DETAILED DESCRIPTION OF THE PREFERRED EMBODIMENTS

A description will be given of an embodiment of an image forming apparatus according to the present invention, with reference to FIGS. 1 through 4.

Figure 1:
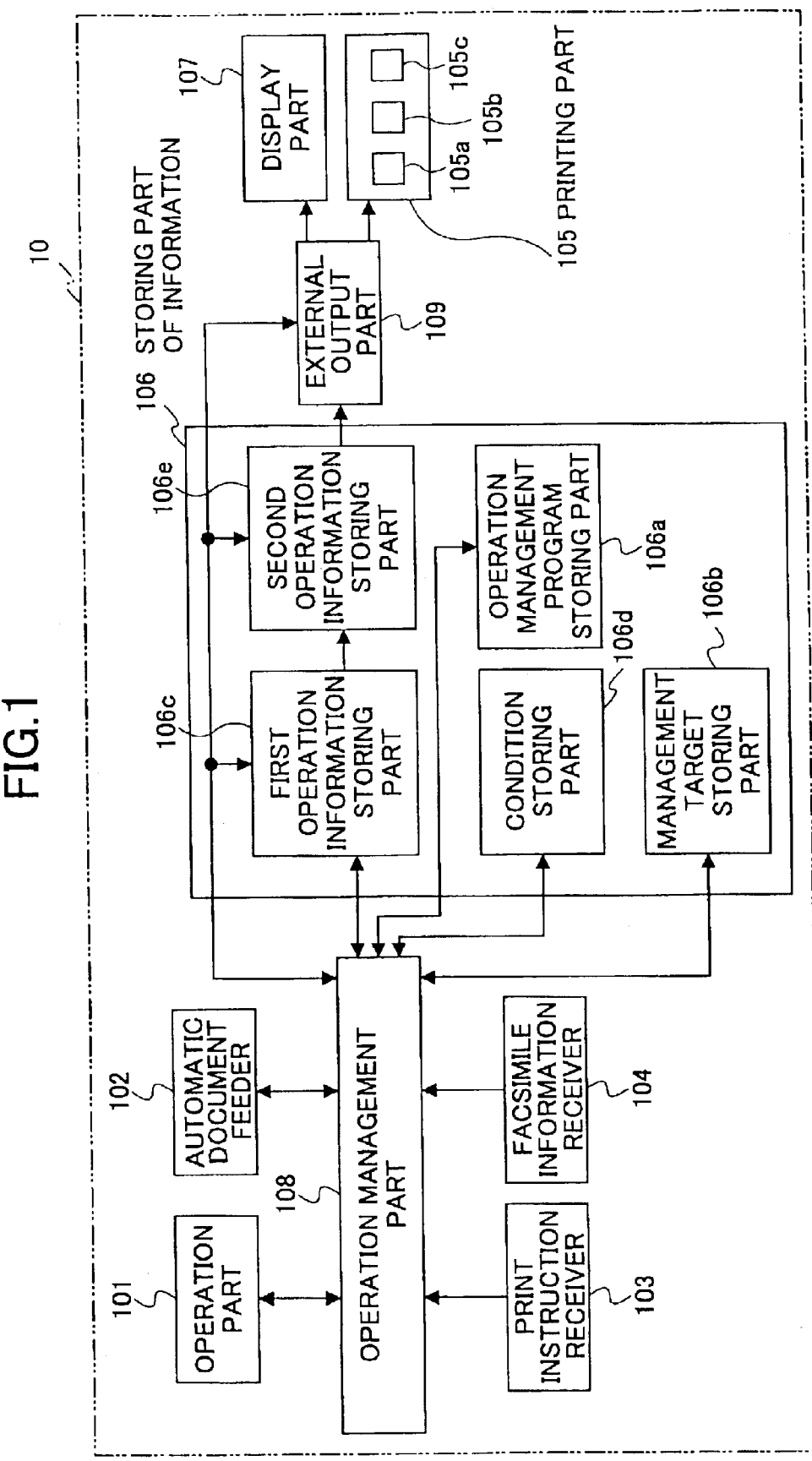
FIG. 1 is a block diagram showing the function of an image forming apparatus.

FIG. 1 is a functional diagram showing the function of an image forming apparatus 10 that is a digital multi-functional apparatus.

As shown in FIG. 1, the image forming apparatus 10 includes an operation part 101, an automatic document feeder 102, a print instruction receiver 103, a facsimile information receiver 104, a printing part 105, a storing part 106 for storing information, a display part 107, an operation management part 108, and an external output part 109.

The operation part 101 is for receiving setting data (operation information) and the like. For example, operation keys, a touch panel and the like correspond to the operation part 101. As the operation keys, there are keys of paper feed trays and paper delivering trays, a scale key for scaling, numeric keys, a size designation key, a designation key for designating one side or both sides, a copy start key and the like, for example.

As the setting data, there are designations of the paper feed tray and the paper delivering tray, magnification ratio of scaling, copy quantity, size designation, designation of one side or both sides, and the like, for example.

The automatic document feeder 102 is for automatically feeding a set document. It should be noted that the automatic document feeder 102 receives document set information (the operation information) indicating the state of the set document.

The print instruction receiver 103 is for receiving a print instruction. For example, a communication board and the like correspond to the print instruction receiver 103.

The facsimile information receiver 104 is for receiving facsimile information. For example, a communication board and the like correspond to the facsimile information receiver 104.

The printing part 105 is for printing out. The printing part 105 performs processes such as feeding a sheet of transfer paper, transferring, fixing, and delivering.

More specifically, as shown in FIG. 1, the printing part 105 includes an optical system control unit 105a, a motor control unit 105b, a sensor sensitivity control unit 105c and other parts required for printing out.

The optical system control unit 105a is for controlling the driving of an exposure lamp for exposing a document that is a copy target of a document scanner.

The motor control unit 105b is for controlling driving of parts such as a photo conductor system of the image forming apparatus 10.

The sensor sensitivity control unit 105c is for variably controlling various sensors (a voltage sensor, a light volume sensor, an electric current sensor and the like).

A RAM, ROM, HDD and the like, for example, correspond to the storing part 106. The storing part 106 includes an operation management program storing part 106a, a management target storing part 106b, a first operation information storing part 106c, an operation information storing condition storing part (hereinafter referred to as a "condition storing part") 106d, and a second operation information storing part 106e.

The operation management program storing part 106a stores an operation management program for managing the operation of the image forming apparatus 10.

The management target storing part 106b stores management targets that the operation management part 108 should manage.

The "management targets" includes, for example, the operation part 101, the automatic document feeder 102, the print instruction receiver 103, the facsimile information receiver 104, and the printing part 105.

For example, in a case of the operation part 101, the management targets are determination of occurrence of malfunction of the optical system, and accumulation of the setting data.

For another example, in a case of the automatic document feeder 102, the management targets are determination of a paper jam and accumulation of the document set information.

For yet another example, in the cases of the print instruction receiver 103 and facsimile information receiver 104, the management target is determination of disconnection and the like.

For still another example, in a case of the printing part 105, the management targets are determination of a paper jam, determination of whether or not the output values of the various sensors are correct, and accumulation of the output values.

The first operation information storing part 106c accumulates, in chronological order, the operation information relating to the operation that the operation management part 108 manages. It should be noted that the storing area of the first operation information storing part 106c is set in advance.

The "operation information to be accumulated" is information relating to the operation of the operation part 101, automatic document feeder 102, or printing part 105. The "operation information to be accumulated" is accumulated with date and hour of the operation (for example, month, day, hour, minute, second).

The operation information may be, for example, the setting data received via the operation part 101, the document set information received via the automatic document feeder 102, and the output values relating to the various sensors that are output during the operation of the printing part 105.

It should be noted that since the operation information accumulated in the first operation information storing part 106c is periodically accumulated in the predetermined storing area, the accumulated information is sequentially deleted.

The condition storing part 106d stores an operation information storing condition. The operation information storing condition refers to a condition for storing a part of the operation information sequentially accumulated in the first operation information storing part 106c in the second operation information storing part 106e, when a malfunction occurs in the image forming apparatus 10 in operation.

The "operation information storing condition" is a condition of storing (for example, transferring) the operation information accumulated in the first operation information storing part 106c in the second operation information storing part 106e during a predetermined time interval (for example, ten seconds) before a malfunction occurring time when a malfunction occurs in the image forming apparatus 10 in operation.

As "cases where a malfunction occurs in the image forming apparatus 10 in operation", there are cases where a malfunction occurs in the optical system when the operation part 101 is in operation, where a paper jam occurs when the automatic document feeder 102 is in operation, where the output values relating to the various sensor exceed proper values when the printing part 105 is in operation, and the like.

The reason for "storing a part of the operation information in the second operation information storing part 106e" is that the operation information accumulated in the first operation information storing part 106c before the malfunction occurs in the image forming apparatus 10 is deleted if kept stored in the first operation information storing part 106c, though the accumulated operation information includes the key to investigate the causes of the malfunction. That is, the reason is to ensure the positive storing of the operation information including the key to investigate the causes of the malfunction.

The second operation information storing part 106e stores a part of the operation information stored in the first operation information storing part 106c in chronological order.

The display part 107 is for displaying information. For example, an LCD and the like correspond to the display part 107.

The operation management part 108 manages the operation of the image forming apparatus 10 in operation. For example, a processing control unit such as a CPU corresponds to the operation management part 108.

The external output part 109 refers to cumulative results accumulated in the first operation information storing part 106c, and outputs the operation information according to the cumulative results to the outside. For example, a processing control unit such as a CPU corresponds to the external output part 109. It should be noted that the output to the outside refers to printing by the printing part 105, displaying on the display part 107, and the like.

A detailed description will be further given of this embodiment.

When managing the operation of the image forming apparatus 10, the operation management part 108 stores, in the second operation information storing part 106e, parts of the operation information stored in the first operation information storing part 106c in chronological order based on the operation information storing condition when a malfunction occurs in the image forming apparatus 10 in operation.

Then, the external output part 109 refers to the storage result stored in the second operation information storing part 106e, and outputs the operation information according to the storage result to the outside. It should be noted that the output to the outside refers to printing by the printing part 105, displaying on the display part 107, and the like.

Additionally, in this embodiment, when managing the operation of the image forming apparatus 10 in operation, the operation management part 108 carries out the operation management program stored in the operation management program storing part 106a. The operation management part 108 stores the descriptions of parts of the operation management program in the second operation information storing part 106e in chronological order according to the execution of the operation management program.

"Storing the descriptions of parts of the operation management program according to the execution of the operation management program" refers to storing the description of a part of the operation management program in a predetermined area when a predetermined line in the operation management program is executed.

The descriptions of the parts of the operation management program stored in chronological order are stored together with the execution date and hour (for example, month, day, hour, minute and second) of the parts of the operation management program.

Then the external output part 109 refers to the storage result stored in the second operation information storing part 106e, and outputs the descriptions of the parts of the operation management program according to the storage results to the outside. It should be noted that the output to the outside refers to printing by the printing part 105, displaying on the display part 107, and the like.

Next, a description will be given of a specific construction of the image forming apparatus 10, with reference to FIG. 2.

Figure 2:
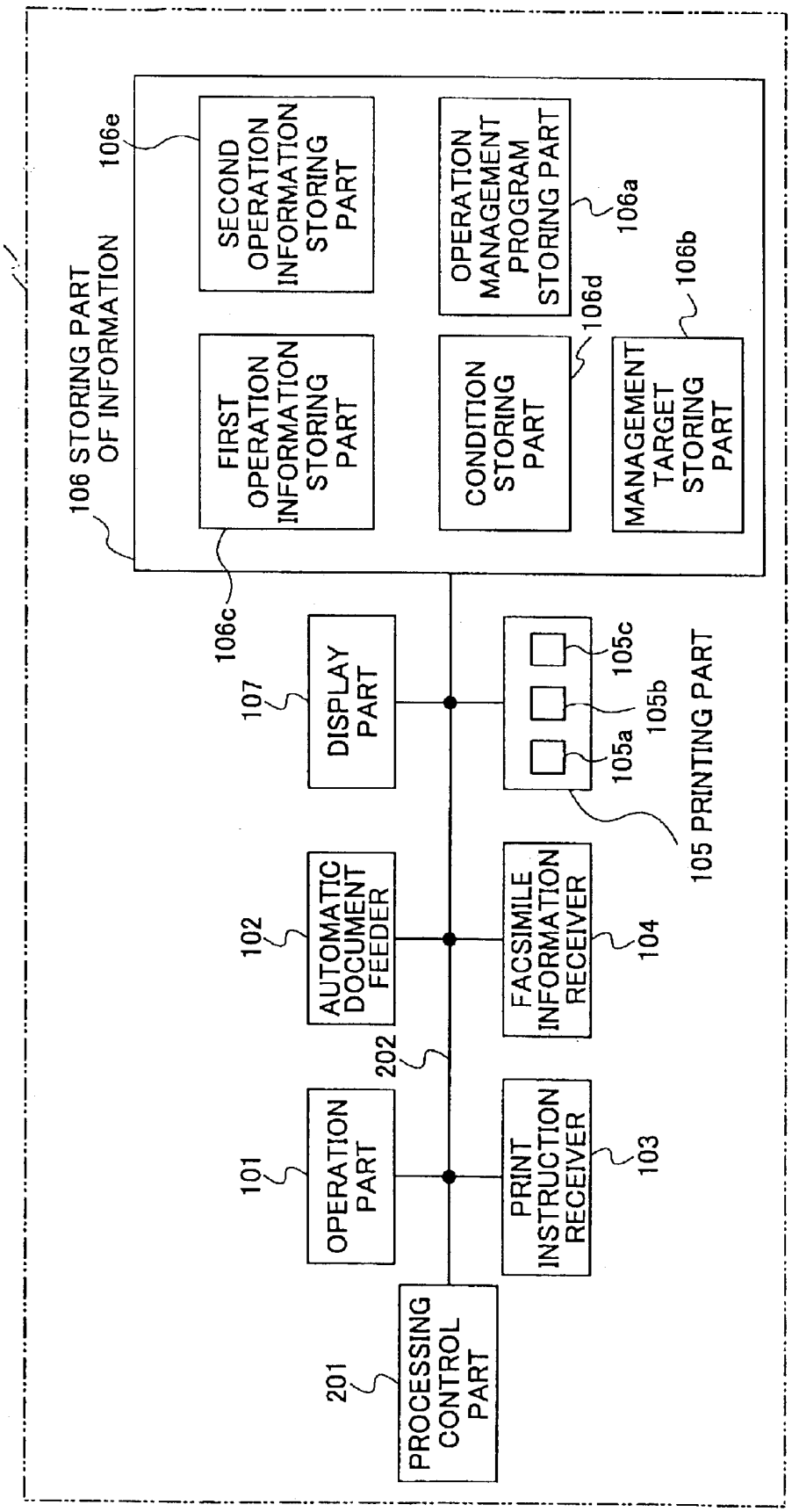
FIG. 2 is a block diagram showing the construction of the image forming apparatus.

FIG. 2 is a block diagram showing the construction of the image forming apparatus 10. In FIG. 2, those parts that are the same as those corresponding parts in FIG. 1 are designated by the same reference numerals, and an overlapping description thereof will be omitted.

As shown in FIG. 2, in the image forming apparatus 10, the operation part 101, the automatic document feeder 102, the print instruction receiver 103, the facsimile information receiver 104, the printing part 105, the storing part 106, the display part 107, and a processing (arithmetic processing) control unit 201 are connected via a bus 202.

It should be noted that the processing control unit 201 is similar to the operation management part 108 and external output part 109 in FIG. 1.

Next, a description will be given of the operation in this embodiment, with reference to FIG. 3.

Figure 3:
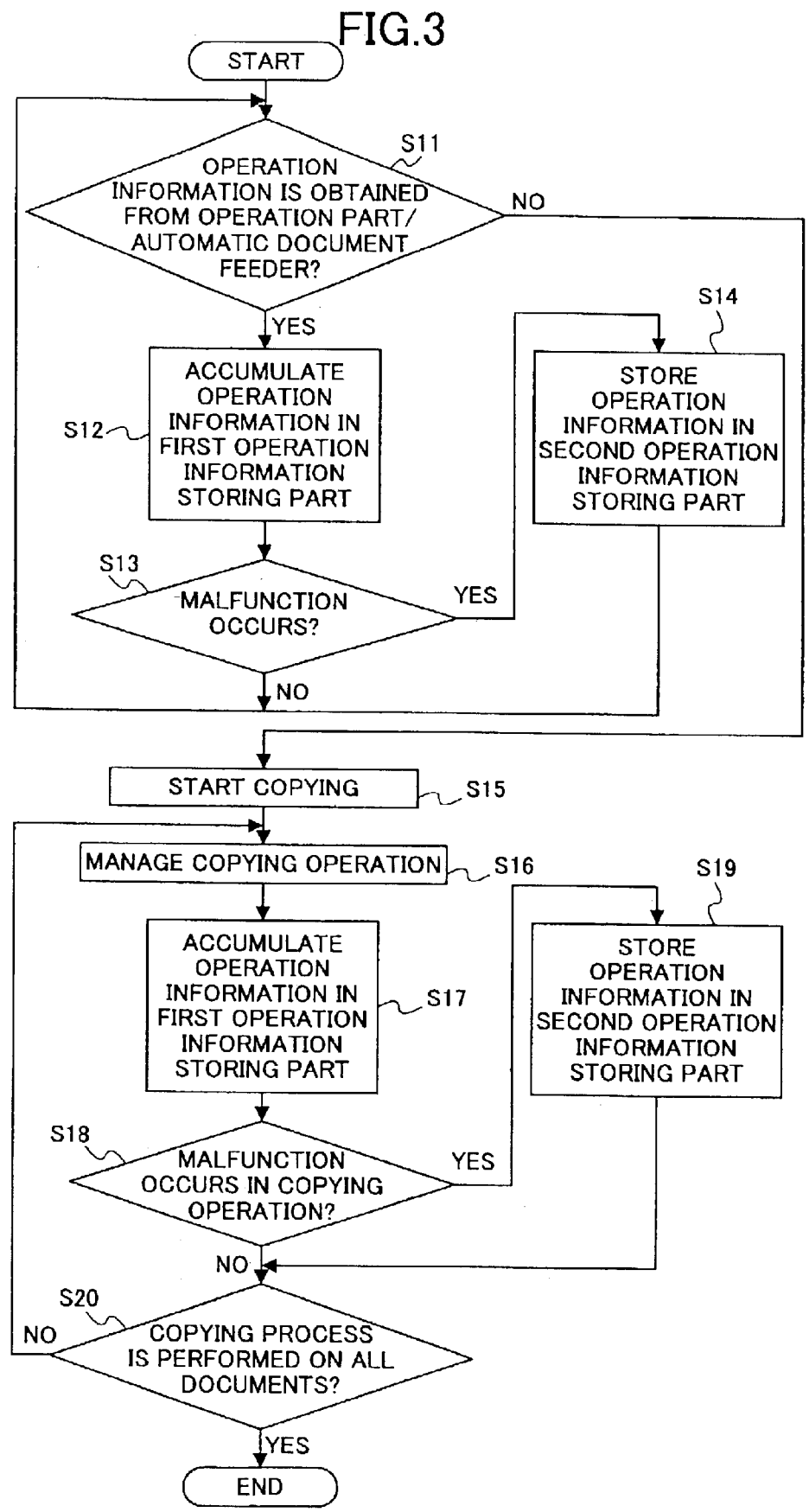
FIG. 3 is a flow chart for explaining a process of the image forming apparatus.

FIG. 3 is a flow chart showing the process of the image forming apparatus.

In the following, a description will be given by taking, as an example, a case where a digital multi-functional apparatus that is the image forming apparatus 10 performs a copying process. In this process, the operation management program, the management targets and the operation information storing conditions are stored in the storing part 106 in advance. Further, the management targets are the operation part 101, the automatic document feeder 102 and the printing part 105. The process is performed in the following procedure.

First, in step S11, it is determined whether or not the operation information is obtained from the operation part 101 or the automatic document feeder 102. When a document is set to the automatic document feeder 102 (YES in step S11), the operation management part 108 stores the document set information (operation information) relating to the operation of the automatic document feeder 102 in the first operation information storing part 106c in step S12.

For example, the document set information to be accumulated is accumulated with the date and hour (month, day, hour, minute and second) when the document is set. In addition, the number of set documents is one.

When the operation management part 108 receives the setting data (operation information) via the operation part 101 (YES in step S11), the operation management part 108 stores the received setting data in the first operation information storing part 106c in step S12.

For example, the setting data is received via the numeric keys, and the setting data is a magnification ratio. Also, the setting data to be accumulated are accumulated with the date and hour (month, day, hour, minute and second) of when the setting data are received.

In step S13, it is determined whether or not a malfunction occurs in the operation part 101 in operation. When it is determined that a malfunction occurs in the operation part

101 in operation (YES in step S13), in step S14, the operation management part 108 stores, in the second operation information storing part 106e, a part of the operation information accumulated in the first operation information storing part 106c in chronological order based on the operation information storing condition stored in the condition storing part 106d.

For example, the part of the operation information to be stored is stored with the date and hour (month, day, hour, minute and second) when the malfunction occurs.

The reason for storing the part of the operation information stored in the first operation information storing part 106c in the second operation information storing part 106e is to prevent the part of the operation information having the key to investigate the causes of the occurrence of the malfunction from being deleted.

For example, the part of the operation information stored in the second operation information storing part 106e is the setting data transferred from the first operation information storing part 106c.

Next, when the operation management part 108 receives, via the operation part 101, an instruction to start copying in step S15, the operation management part 108 manages the copying operation of the printing part 105 in operation in step S16, and accumulates the operation information relating to the copying operation of the printing part 105 in the first operation information storing part 106c in chronological order in step S17.

For example, the instruction to start copying is received via the copy start key, and the operation information further accumulated is output values relating to the various sensors. In addition, the operation information to be accumulated is accumulated with the data and hour (month, day, hour, minute and second) of the copying operation.

Then, in step S18, it is determined whether or not a malfunction occurs in the copying operation of the printing part 105 in operation. In a case where a malfunction occurs in the copying operation of the printing part 105 (YES in step S18), in step S19, the operation management part 108 stores, in the second operation information storing part 106e, the part of the operation information accumulated in the first operation information storing part 106c in chronological order based on the operation information storing condition stored in the condition storing part 106d.

For example, the operation information stored in the second operation information storing part 106e is the output values relating to the various sensors transferred from the first operation information storing part 106c.

In step S20, whether or not the copying process is performed (completed) on all documents is determined. According to the above-described process, the copying process of the image forming apparatus 10 ends.

Hence, the operation information (for example, the document set information, the setting data, the output values of the various sensors) forming the operation history of the image forming apparatus 10 is accumulated in the first operation information storing part 106c. In addition, the operation information (for example, the setting data, the output values of the various sensors) forming the operation history of the image forming apparatus 10 in abnormal states is stored in the second operation information storing part 106e.

Next, after the process as shown in FIG. 3, upon receiving a request from the operation part 101, the external output part 109 refers to the cumulative result accumulated in the first operation information storing part 106c, and displays the operation information on the display part 107 according to the cumulative result.

For example, as shown in FIG. 4, the operation information is displayed with month, day, hour, minute and second. It should be noted that, in FIG. 4, "back" and "forward" are for switching the display.

In this manner, the operation history of the copying process of the image forming apparatus 10 is displayed.

Further, upon receiving a request from the operation part 101, the external output part 109 refers to the storage results stored in the second operation information storing part 106e and displays the operation information according to the storage result on the display part 107. Similar to the case of FIG. 4, the operation information is displayed with month, day, hour, minute and second.

In this way, the operation history of the copying process in abnormal states of the image forming apparatus 10 is displayed.

On the other hand, after the process as shown in FIG. 3, upon receiving the request from the operating part 101, the external output part 109 may refer to the cumulative results accumulated in the first operation information storing part 106c and print the operation information according to the cumulative results using the printing part 105.

In addition, upon receiving the request from the operation part 101, the external output part 109 may refer to the storage results stored in the second operation information storing part 106e and print the operation information according to the storage results using the printing part 105.

(Storing/Output Process of the Description of the Operation Management Program)

In the process performed in the steps S11 through S20, the operation management part 108 stores, in the second operation information storing part 106e, the descriptions of parts of the operation management program in chronological order, according to the execution of the operation management program read from the operation management program storing part 106a.

Then, the external output part 109 refers to the storage results stored in the second operation information storing part 106e and displays, on the display part 107, the description of the operation management program according to the storage results.

For example, the description of the operation management program is displayed with date and hour (for example, month, hour, minute and second).

(Change Process of Management Target)

In the process performed in steps S11 through S20, based on a change request that the operation part 101 receives, the operation management part 108 may update the management target stored in the management target storing part 106b, refer to the management target stored in the management storing part 106b, and manage only the updated management target.

For example, the management target may be only the operation part 101, and only the setting data may be stored in the first operation information storing part 106c. In addition, only the document set information or the output values of the various sensors may be stored. Further, it is possible to flexibly combine the management targets. Also, it is possible to delete (cancel) all management targets.

(Change Process of Storing Area of the First Operation Information Storing Part)

Based on a change request that the operation part 101 receives, the operation management part 108 may change the storing area that is set in advance for the first operation information storing part 106c, and accumulate the operation information in chronological order in the changed storing area when accumulating the operation information in chronological order in the predetermined storing area of the first operation information storing part 106c. In this case, it is possible to accumulate the operation information corresponding to the memory resources.

As described above, according to this embodiment, the operation of the image forming apparatus 10 is managed, the operation information is accumulated in chronological order in the first operation information storing part 106c, and the operation information according to the cumulative results is output to the outside. Thus, it is possible to confirm the operation history of the image forming apparatus 10. Accordingly, when a malfunction occurs in the image forming apparatus 10 and maintenance therefor is performed, it is possible for the maintenance man to investigate the causes of the malfunction having low repeatability and perform a correct repairing process.

Additionally, when a malfunction occurs in the operation of the image forming apparatus 10, a part of the operation information accumulated in chronological order in the first operation information storing part 106c is stored in the second operation information storing part 106e, and the operation information according to the storage results stored in the second operation information storing part 106e is output to the outside. Thus, it is possible to confirm the operation history of the image forming apparatus 10 at the time of occurrence of the malfunction. Accordingly, it is possible to confirm only the operation history having the key to investigate the causes of the malfunction.

Also, the first operation information storing part 106c accumulates at least one of the setting data received via the operation part 101 and the output values relating to the various sensors that are output during the operation of the printing part 105. Thus, it is possible for the maintenance man to confirm for sure the operation history of the image forming apparatus 10.

Further, as the operation management program is executed, the descriptions of the parts of the operation management program are stored in chronological order in the second operation information storing part 106e, and the descriptions of the parts of the operation management program according to the storage result stored in the second operation information storing part 106e are output to the outside. Thus, it is possible to confirm the descriptions of the parts of the operation management program at the moment when the malfunction occurs in the image forming apparatus 10. Accordingly, it is possible to determine the process of the execution of the program where the malfunction occurs. Hence, it is possible to rapidly investigate the causes of the trouble.

The present invention is not limited to the above-described embodiment. For example, in a case where the image forming apparatus 10 performs a printing process, a print instruction may be received via the print instruction receiver 103, and the operation management part 108 may manage the operation of the printing part 105. In this case, during the operation of the image forming apparatus 10, the operation management part 108 performs the process of steps S15 through S20 while managing the operation of the print instruction receiver 103 such as a disconnected state.

Also, the same applies to a case where the image forming apparatus 10 performs a facsimile process.

In addition, the image forming apparatus 10 may be used as a printing machine, facsimile machine, and a copying machine.

The present invention is not limited to the specifically disclosed embodiments, and variations and modifications may be made without departing from the scope of the present invention.

The present application is based on Japanese priority application No. 2002-075502 filed on Mar. 19, 2002, the entire contents of which are hereby incorporated by reference.

What is claimed is:

1. An image forming apparatus, comprising:
   an operation management part managing an operation of said image forming apparatus;
   a first operation information storing part periodically accumulating in a predetermined storing area thereof operation information relating to the operation managed by said operation management part; and
   an external output part referring to cumulative results accumulated in said first operation information storing part and outputting to outside the operation information according to the cumulative results,
   wherein the predetermined storing area is changed by said operation management part based on a change request input to said image forming apparatus.

2. The image forming apparatus as claimed in claim 1, further comprising:
   an operation part operating information; and
   a printing part,
   wherein the operation management part manages at least one of operation of said operation part and operation of said printing part, when managing the operation of the image forming apparatus, and
   the first information storing part accumulates at least one of setting data received via said operation part and output values of various sensors of said printing part in operation.

3. An image forming apparatus, comprising:
   an operation management part managing an operation of said image forming apparatus;
   a first operation information storing part accumulating in chronological order operation information relating to the operation managed by said operation management part;
   an external output part referring to cumulative results accumulated in said first operation information storing part and outputting to outside the operation information according to the cumulative results;
   a second operation information storing part accumulating a part of the operation information accumulated in the first operation information storing part in chronological order; and
   a condition storing part storing a condition for storing, in said second operation information storing part, the part of the operation information accumulated in the first operation information storing part in chronological order, when a malfunction occurs in the operation of the image forming apparatus,
   wherein, based on the condition, the operation management part stores the part of the operation information accumulated in the first operation information storing part in chronological order in said second operation information storing part in a case where the malfunction occurs in the operation of the image forming apparatus when managing the operation of the image forming apparatus, and the external output part refers to storage results stored in said second operation information storing part and outputs to outside the operation information according to the storage results.

4. The image forming apparatus as claimed in claim 3, further comprising:

an operation management program storing part storing an operation management program for managing the operation of the image forming apparatus, wherein the operation management part executes the operation management program when managing the operation of the image forming apparatus, and stores description of the operation management program in chronological order in the second operation information storing part according to the execution of the operation management program.

5. An image forming apparatus, comprising:

an operation management part managing an operation of said image forming apparatus;

a first operation information storing part accumulating in chronological order operation information relating to the operation managed by said operation management part;

an external output cart referring to cumulative results accumulated in said first operation information storing part and outputting to outside the operation information according to the cumulative results;

a management target storing part storing a management target to be managed by the operation management part; and an operation part receiving a change request of the management target, wherein the operation management part updates the management target based on the change request received by said operation part, and when managing the operation of the image forming apparatus, the operation management part refers to the management target stored in said management target storing part and manages only the updated management target.

* * * * *